Jan. 14, 1964 T. R. MEEKER ETAL 3,118,133

INFORMATION STORAGE MATRIX UTILIZING A DIELECTRIC OF PRESSURE CHANGEABLE PERMITTIVITY

Filed April 5, 1960 2 Sheets-Sheet 1

INVENTORS: T. R. MEEKER
H. L. STADLER
BY Kenneth B Hamlin
ATTORNEY

Jan. 14, 1964 T. R. MEEKER ETAL 3,118,133

INFORMATION STORAGE MATRIX UTILIZING A DIELECTRIC OF PRESSURE CHANGEABLE PERMITTIVITY

Filed April 5, 1960 2 Sheets-Sheet 2

INVENTORS: T. R. MEEKER
H. L. STADLER

BY Kenneth B Hamlin

ATTORNEY 3,118,133

INFORMATION STORAGE MATRIX UTILIZING A DIELECTRIC OF PRESSURE CHANGEABLE PERMITTIVITY

Thrygve R. Meeker and Henry L. Stadler, Whippany, N.J., assignors to Bell Telephone Laboratories, Incorporated, New York, N.Y., a corporation of New York Filed Apr. 5, 1960, Ser. No. 20,217
12 Claims. (Cl. 340—173)

Figure 1:
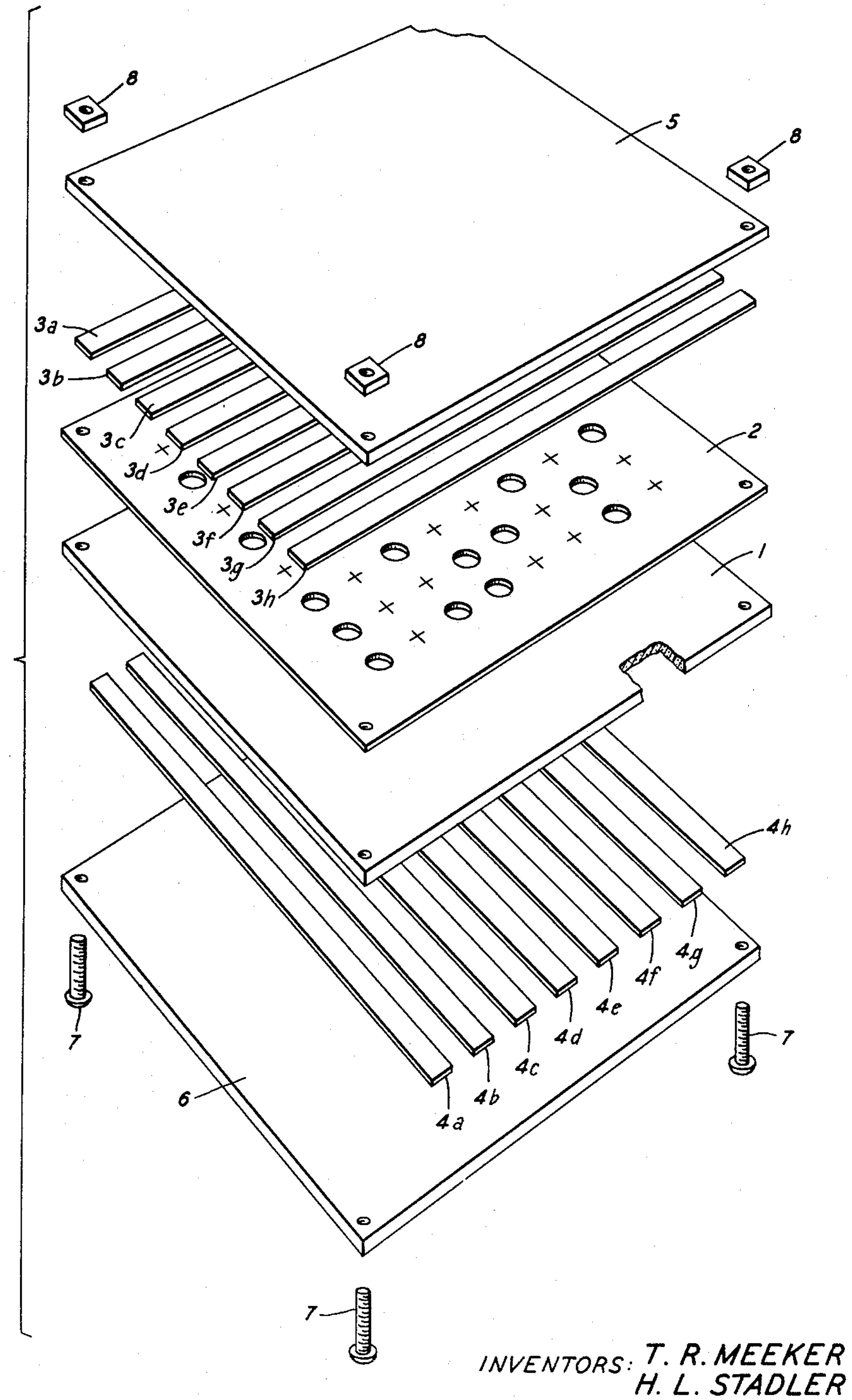

This invention relates generally to memory circuits and more particularly to such circuits employing ferroelectric capacitors.

With the increasing utility of modern computers and information handling systems, it has become ever more important to provide simple, rapid and yet economical apparatus for the storage and readout of information. Of the many known information storage arrangements those employing changeable cards as memory generally have one or more but not all of these desirable characteristics. Their relative economy depends to a large extent upon the sensing device employed and the type of changeable card utilized. For example, priorly some form of physical contact was employed by the sensing devices. In one instance a card having an opaque or nonopaque surface representing the different binary digits is scanned by an electron beam to read out the stored information. In this instance the sensing device is relatively expensive and requires complicated auxiliary circuitry. In another instance a card having the presence or absence of a dielectric material representing the different binary digits is employed as a memory with the presence or absence of dielectric material corresponding to the plurality of capacitors in a matrix. The stored information is sensed by reading the presence or absence of capacitive coupling in the plurality of capacitors. In this other instance, although the sensing device is not as expensive as that utilizing a scanning electron beam, the different dielectric plates that are required for each set of information determine its relative economy. As to both of these abovementioned instances which are typical of the prior art there are present deficiencies in factors of simplicity, economy and rapidity of readout.

Therefore, it is a general object of this invention to substantially eliminate the deficiencies of the prior art by providing a new sensing method for reading out information stored in changeable card memory arrangements.

More particularly the objects of this invention are to provide a more economical sensing device for card changeable memory units, to provide a simpler changeable card memory, to provide a sensing device capable of rapid access to and rapid readout of random information, and to provide such an information storage arrangement that will provide substantial reliability with the use of relatively little power.

It has been found that the permittivity of a *c* domain barium titanate crystal will increase substantially in response to a compressional force applied to the *c* axis dimension. The permittivity of a dielectric material is a measure of the ability of the dielectric material to hold electrical charge. Thus a change in permittivity causes a direct change in the value of capacitance of a capacitor utilizing the dielectric material.

This property of the barium titanate is utilized in accordance with the invention to attain the aforementioned objects. A specific illustrative embodiment of this invention comprises an upper and a lower set of parallel electrodes printed on an upper and lower covering layer respectively, which electrodes are postioned substantially at right angles to each other and separated by a barium titanate plate and a changeable memory card. The barium titanate plate is a single *c* domain crystal whose *c* axis is perpendicular to the planes of the covering layers. The memory card has information stored therein as the presence or absence of apertures corresponding to the binary states of "0" or "1," respectively. Each aperture or lack of aperture is associated with a crosspoint caused by the intersection of the upper and lower electrodes, which crosspoints form a plurality of capacitors.

In accordance with this invention, a stress is applied perpendicular to the upper and lower covering layers by a pressure applying means to strain the barium titanate crystal in the *c* direction, thus causing the permittivity of the barium titanate plate at the particular crosspoints corresponding to the absence of an aperture to have a greater value than the value of permittivity where there is the presence of an aperture. The memory card controls the transmission of the stress to the barium titanate plate. In this manner the capacitors associated with the absence of apertures in the memory card have a greater value of capacitance than the capacitors associated with the presence of apertures. The different values of capacitances are read by an output circuit.

It is a feature of this invention that information be stored in a plurality of capacitors, each having a dielectric material of barium titanate, by applying pressure to the *c* axis of the barium titanate of particular ones of the plurality of capacitors to change their permittivity.

It is a further feature of this invention that an insulating sheet in which information is stored as the presence or absence of apertures be utilized to control the pressure applied to the barium titanate dielectric material of a plurality of capacitors to enable two distinguishable levels of capacitance to exist in the plurality of capacitors.

Other features of this invention are that two sets of parallel electrodes be set substantially at right angles to each other defining a plurality of intersections, that the electrodes be separated by a sheet of insulating material on which information is stored as a plurality of perforations and a dielectric plate having pressure changeable permittivity, that pressure be employed to change the permittivity of the selected areas of the dielectric material associated with the particular intersection in accordance with information stored in the insulating sheet and that the changed permittivity of the particular intersections be interrogated by a sensing circuit and read by an output circuit.

Further features of this invention are that a plurality of capacitors be defined by the intersections of two sets of parallel conductors separated by a *c* domain barium titanate plate and a memory card having the binary states represented by the presence or absence of perforations and that the information stored therein be indicated by binary states of capacitance resulting from the application of pressure parallel to the *c* direction of the barium titanate plate and that the said binary states of capacitance be sensed by an interrogating pulse source and read by an output circuit.

Figure 2:
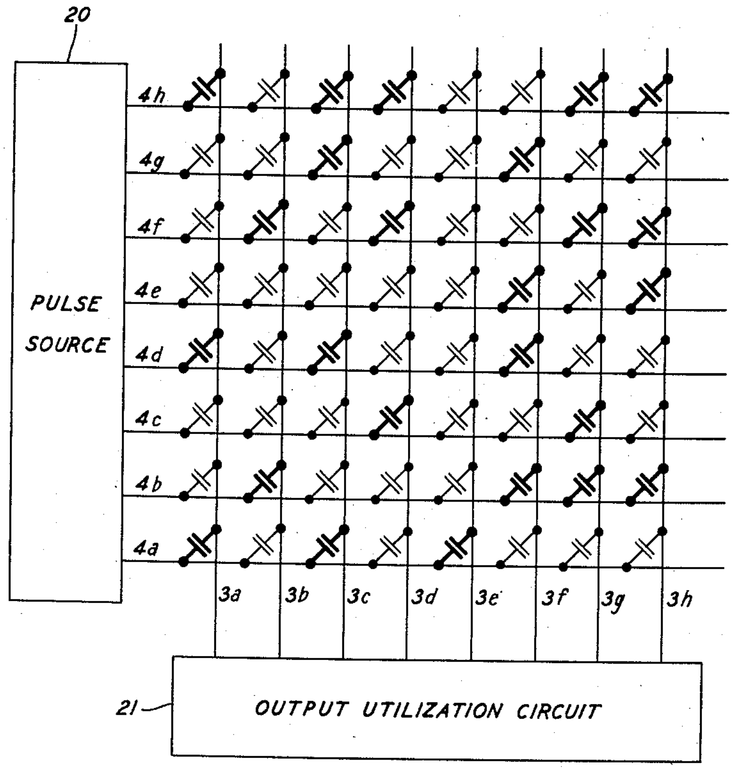

A complete understanding of this invention and of these and other features thereof may be gained from a consideration of the following detailed description together with the accompanying drawings in which:

FIG. 1 is illustrative of one embodiment of this invention showing in an exploded pictorial view the relative positions of the component elements; and FIG. 2 shows a schematic representation of the matrix of information contained in the memory card and transferred to the capacitors shown in FIG. 1 together with an output circuit and a pulse source.

Turning now to FIG. 1, a dielectric plate 1 and a changeable memory card 2 are shown positioned between an upper covering layer 5 and a lower covering layer 6.

The upper covering layer 5 has adjacent thereto a plurality of upper electrodes 3a–3h and the lower covering layer 6 has adjacent thereto a plurality of lower electrodes 4a–4h. The electrodes of each set are arranged parallel to each other and the sets are positioned with the upper plurality of electrodes set at substantially right angles to the lower plurality of electrodes. Thus each of the upper electrodes crosses each of the lower electrodes at right angles defining thereby a plurality of crosspoints in columns and rows at their intersections.

The upper covering layer 5 and the lower covering layer 6 are made of an insulating material of sufficient thickness to form a rigid structure that will evenly distribute any stress that is applied to their flat surfaces. The particular geometrical shape shown is large enough to cover an 8×8 matrix of crosspoints. Any other type of matrix will have a correspondingly larger or smaller geometrical shape. Although not specifically shown in the drawings, advantageously the upper plurality of electrodes 3 and the lower plurality of electrodes 4 can be fabricated on the upper covering layer 5 and the lower covering layer 6, respectively, by well-known printed circuit techniques. The use of printed circuit techniques enables the electrodes and covering layers to be made of one-piece construction thereby permitting easy assembly and disassembly of the entire memory arrangement and facilitating the interchange of memory cards.

In accordance with an important feature of this invention the dielectric plate 1 is a c domain barium titanate crystal having its c axis perpendicular to the faces of the upper and lower covering layers. It is manufactured as a single crystal and its particular axes' directions are set during the manufacturing process by having it electrically poled so that its c axis will be in a desired direction. In this case the desired direction is perpendicular to the upper and lower covering layers. The barium titanate plate 1 is also uniform throughout with no particular marks placed thereon corresponding to the crosspoints.

With reference again to FIG. 1, the dielectric plate 1 is between the upper plurality of electrodes 3 and lower plurality of electrodes 4. The plurality of crosspoints caused by the intersection of the upper plurality of electrodes with the lower plurality of electrodes are then essentially a plurality of capacitors. Each of the plurality of capacitors may have one or more values of capacitance depending upon the value of permittivity of the dielectric, which value of permittivity depends upon the stored information. In one condition, when no pressure is applied to the barium titanate, it has a predetermined value of permittivity. Therefore, the capacitors associated therewith have a predetermined established value of capacitance. In a second condition the value of permittivity of the barium titanate is greatly increased over that of the initial condition. Therefore, the value of capacitance of the capacitors associated therewith is greatly increased. This increased value of permittivity results when a slight pressure is applied to the barium titanate in its c axis direction.

The initial predetermined value of capacitance and increased value of capacitance are considered as two separate binary states and in accordance with a feature of this invention are utilized in the present memory arrangement by storing the information in a changeable card 2 set between the barium titanate plate 1 and the upper plurality of electrodes 3. The changeable card 2 is a sheet of any type of insulating material of arbitrary geometric shape and predetermined thickness, and has substantially no effect on the value of capacitance of the plurality of capacitors other than controlling the application of pressure to particular areas of the barium titanate plate in accordance with stored information. Advantageously the card 2 is interchangeable so that a plurality of message word groups can be stored and sensed by the use of a single memory arrangement as shown.

It is to be understood that this embodiment is only used to illustrate the principles of this invention and is not meant to necessarily limit it thereto and that other arrangements can be employed. For example, the changeable card 2 can alternatively be set above the upper plurality of electrodes 3 or below the lower plurality of electrodes 4 with the plurality of electrodes printed on the barium titanate plate and the upper and lower covering layers (5 and 6) disposed adjacent thereto. Thus, advantageously, no electrical connections need be moved or broken when interchanging the changeable card 2. However, the discussion hereinafter will be only with respect to the illustrative embodiment depicted in FIG. 1.

Binary information is stored in the card as the presence or absence of holes. When a hole is present at a crosspoint the particular area of the barium titanate plate associated therewith is not strained and the capacitance of the capacitor associated therewith has a first predetermined value. On the other hand when there is no hole present in the changeable card 2 the particular area of the barium titanate plate associated therewith is strained and the capacitance of the capacitor associated therewith has a second predetermined value which is greater than the first value. In a manner to be described hereinafter, pressure is applied to the plurality of capacitors to strain selected areas of the barium titanate plate which areas are at the location where the crosspoints have associated therewith lack of a hole in the changeable card. The changeable card is of sufficient thickness to transmit the pressure through the electrodes to the barium titanate plate where there is a lack of a hole and to not transmit the pressure where there is a hole. Thus the presence or absence of holes in the card represents the binary states and controls the amount of capacitance of each of the plurality of capacitors.

In an alternative manner, where the presence and absence of apertures in the changeable card are undesirable, the changeable card can utilize the presence or absence of raised spots. The raised spots would perform the same function as the absence of holes in the changeable card depicted in FIG. 1 and the flat unraised surfaces would perform the same function as the presence of holes. The same advantages of the changeable card of FIG. 1 would accrue for this alternative manner of information storage. In the following discussion, the illustrative embodiment depicted in FIG. 1 will only be discussed.

The presence of a hole in the changeable card 2 represents a binary "0" and the absence of a hole represents a binary "1." A hole is shown in the drawing as a "0" and the absence of a hole is shown by an "X." In actual practice, of course, there is no "X" marked on the memory card. These are only shown herein to indicate the location of crosspoints or capacitors to which the binary digits would correspond. For specific example, the bottom left row in the memory card 2 represents the stored information as being 10101000 proceeding from left to right. These binary digits correspond to the capacitors formed by lower electrode 4a intersecting each of the upper plurality of electrodes 3a–3h. The last column has the stored information 01001101 going from bottom to top and corresponds to the capacitors formed by the upper plurality of electrode 3h intersecting each of the lower plurality of electrodes 4a–4h.

Turning again to FIG. 1, bolts 7 and nuts 8 are utilized to fasten together the barium titanate plate 1, changeable card 2, upper covering layer 5 and lower covering layer 6 in the manner indicated. This method of fastening the covering layers 5 and 6, the changeable card 2, and barium titanate plate 1 serves two purposes.

Bolts 7 properly align the memory holes in the memory card 2 to the corresponding crosspoints. Proper alignment is essential to read accurately the stored information and is accomplished in the following manner. An alignment hole is located at each corner of the upper covering layer 5, lower covering layer 6, dielectric plate 1, and memory card 2 as shown, so that when the memory arrangement is stacked together the plurality of bolts 7 will fit through their corresponding alignment holes. Thus the plurality of memory holes in the memory card are properly aligned with the associated plurality of crosspoints and accurate readout of information is attained.

In addition to properly aligning the memory holes in memory card 2 to their associated plurality of crosspoints, the bolts 7 and nuts 8 supply the pressure to the plurality of capacitors that is necessary to enable the particular ones of the plurality of capacitors to have one value of capacitance and the remaining capacitors to have a different value of capacitance. The stress set up by the nut 8 and bolt 7 combinations in this illustrative embodiment is evenly distributed by the upper and lower covering layers to evenly stress the memory card. The memory card, in turn, then controls the amount of stress applied to the particular areas of the barium titanate plate in accordance with the stored binary information. The magnitude of the pressure applied to memory card 2 must be such that where there is the presence of a hole in the memory card, the area of the barium titanate plate associated therewith will not be appreciably strained and where there is the absence of a hole, the area associated therewith will be strained in the *c* dimension. This strain in the *c* dimension of the particular areas of the barium titanate sharply increases the permittivity of the areas and results in a value of capacitance many times the initial level of capacitance prevalent for the capacitors having unstrained areas of the barium titanate dielectric material. It is to be understood that the method of applying the stress to plate 1 and of aligning card 2 with respect to the crosspoints by bolts 7 and nuts 8 is illustrative only and that any other suitable means known in the art may be utilized. For example, a piezoelectric plate inserted between the upper or lower set of electrodes and the upper or lower covering layer can be pulsed to expand and thereby apply pressure to selected areas of the barium titanate plate.

In reference to FIG. 2, the information in the memory card 2 of FIG. 1 is shown transferred to the capacitors formed at the crosspoints of electrodes 3 and 4 as two values of capacitance. In this illustrative embodiment a light line capacitance symbol is used to represent the value of capacitance which corresponds to the location of a hole in memory card 2 and hence represents a binary "0." The bold line capacitance symbol is used to represent the value of capacitance which corresponds to the location of an absence of a hole in memory card 2 and hence represents a binary "1." For example, the bottom row of the matrix corresponds to the bottom left row of the memory card 2 depicted in FIG. 1 and shows the capacitors defined by the intersections of the lower electrode *4a* with the plurality electrodes *3a* through *3h*. The bold line capacitance symbols between conductors *4a* and *3a*, *3c*, and *3e* correspond to the absence of holes in the bottom left row of the memory card 2 and represent a binary "1." The light line capacitance symbols between conductors *4a* and *3b*, *3d*, *3f*, *3g* and *3h* correspond to the holes in memory card 2 and represent a binary "0."

The pulse source 20, which can be of any type known in the art, selectively applies a predetermined pulse to the plurality of capacitors in the sensing process. The binary values of capacitance of the capacitors are then read by an output utilization circuit 21. The stored information is word organized. Thus a particular word desired to be read is sensed by the application of a predetermined interrogating pulse to the particular one of the plurality of conductors *4a* through *4h* involved, and values of capacitance of the plurality of capacitors associated therewith are read by an output utilization circuit 21. When the interrogating pulse is applied by the pulse source 20, the capacitors represented by the bold line capacitance symbols, having greater values of capacitance than those represented by light lines, are able to conduct more current. The different amounts of current indicative of the stored binary information are ready by the output circuit 21. The information can also be bit organized by inserting a clock pulse source into the circuit to supply a timing pulse with which the output circuit can compare the pulse applied to the plurality of capacitors in the matrix. A particular random capacitor can then be easily located and isolated in the sensing process. In this manner the binary values of capacitance of the plurality of capacitors are sensed by the application of an interrogating pulse to the desired conductor common to the desired plurality of capacitors and read by an output circuit as binary values of current flow. For example, a pulse applied to lead *4a* will interrogate the capacitors associated with the information stored in the bottom left row of the memory card. The pulse charges the plurality of capacitors and those having a greater value of capacitance will allow more current to flow to the respective conductors *3a*–*3h* to output utilization circuit 21. Output circuit 21 senses a particular level of capacitance for the plurality of capacitors defined by the intersection of lower electrode *4a* and the upper plurality of electrodes *3b*, *3d*, *3f*, *3g* and *3h* and greater value of capacitance for those capacitors defined by the intersection of the lower electrode *4a* with the upper plurality of electrodes *3a*, *3c* and *3e*.

It is to be understood that the above-described arrangements are illustrative of the principles of the invention. Numerous other arrangements may be devised by those skilled in the art without departing from the spirit and scope of the invention.

What is claimed is:

1. An information storage arrangement comprising a plurality of capacitors each having a pair of electrodes separated by a dielectric material of pressure changeable permittivity, means for storing information in said plurality of capacitors, said means including structural means common to said plurality of capacitors for applying preselected pressures to the dielectric material of particular ones of said plurality of capacitors in accordance with information desired to be stored correspondingly to change the permittivity of the dielectric of said capacitors and thereby to establish at least two levels of capacitances in said plurality of capacitors, said structural means further including changeable card means for governing the amount of pressure applied to the dielectrics of said capacitors, and means for reading out said stored information at different levels of permittivity by sensing levels of capacitances between said pairs of electrodes of said plurality of capacitors, said sensing means including means for applying a predetermined pulse to said pairs of electrodes of a selected group of said capacitors to charge said group of capacitors and output means for detecting the amount of current flow between the electrodes of each capacitor of said group of capacitors.

2. An information storage arrangement for storing an item of information as one of two values in a selected capacitor comprising a plurality of capacitors arranged in a predetermined array and each having a pair of electrodes separated by dielectric material of pressure changeable permittivity, mechanical means common to said plurality of capacitors for applying to the dielectric material of said plurality of capacitors selected pressures thereby to establish between said pairs of electrodes particular levels of permittivity corresponding to particular selected information to be stored in said capacitors, and access means connected to all capacitor electrodes for enabling the sensing of the permittivity level between the electrodes of any of said capacitors; said mechanical means comprising a first pressure plate covering the entire array for subjecting the dielectric material of said capacitors to substantially the same pressure and changeable means for permitting said same pressure to be applied as a first pressure to the dielectric material of particular ones of said capacitors and for transmitting a second pressure to the dielectric material of remaining selected capacitors, said changeable means including an interposer plate of sufficient area to cover said array of capacitors and located between said first pressure plate and said dielectric material of said capacitors whereby pressure applied by said first pressure plate is transmitted through said interposer plate to the dielectric material of all said capacitors, said interposer plate defining capacitor clearance chambers for selected capacitors to reduce the pressure applied to the dielectric material thereof, and the presence and absence of said chambers constituting means whereby said first and second pressures are applied to the dielectric material of said capacitors.

3. The invention defined in claim 2 wherein said capacitors and their positions are defined by overlapping parts of two angularly displaced sets of conducting strips and by said dielectric material separating said overlapping parts, wherein said sets of conducting strips comprise the said access means, wherein the said chambers defined by said interposer plate constitute the definitions by said interposer plate of holes through the thickness of said interposer plate at selected capacitor positions, wherein said interposer plate is located between one set of strips and said dielectric materials, and wherein said strip sets and said interposer plate and said first pressure plate are positioned in layers under pressure.

4. The invention defined in claim 3 wherein one strip set consists of a first plurality of parallel coplanar conducting strips, wherein the other strip set consists of a second plurality of parallel coplanar conducting strips lying in a plane parallel to the plane of said first strips and being perpendicular to said first strips, wherein said dielectric material comprises a continuous homogeneous plate of sufficient area to cover the said array of capacitors, wherein a second pressure plate is provided, and wherein are positioned in layers under pressure in the order as follows said first pressure plate and said one strip set and said interposer plate and said dielectric plate and said other strip set and said second pressure plate.

5. The invention defined in claim 4 wherein said dielectric material is a *c* domain-type crystal having its *c* axis dimension positioned such that any pressure applied thereto will strain said *c* axis dimension to thereby cause corresponding changes of the permittivity of said crystal.

6. The invention defined in claim 5 wherein said *c* domain-type crystal is a barium titanate crystal.

7. An inforation storage arrangement comprising a plurality of capacitors each having a dielectric of pressure responsive ferroelectric material, means for storing binary information in said capacitors, said storing means including structural means common to said plurality of capacitors for applying a first predetermined pressure representing one binary state to particular ones of said capacitors and a second predetermined pressure representing another binary state to others of said capacitors to change the permittivity of the dielectric of said capacitors correspondingly, and means for sensing said information stored in said capacitors, said sensing means including means for individually measuring the capacitance resulting from said changed permittivity of said dielectric of said plurality of said capacitors.

8. An information storage arrangement comprising a first and a second plurality of conductors arranged in orthogonal relationship to define a coordinate array of conductor crossovers, a dielectric sheet of force changeable permittivity positioned between said first and said second plurality of conductors, means for applying a first compressional force between the conductors defining particular ones of said conductor crossovers to establish a first predetermined permittivity in said dielectric sheet therebetween and a second compressional force between the conductors defining others of said conductor crossovers to establish a second predetermined permittivity in said dielectric sheet therebetween, and means for sensing the permittivity of said dielectric sheet between said conductor crossovers.

9. The information storage arrangement defined in claim 8 wherein said means for applying said first compressional force and said second compressional force to said conductor crossovers includes a card of insulating material having binary information stored therein as the presence or absence of apertures arranged in a coordinate array and means for positioning said card adjacent said dielectric sheet between said first and said second plurality of conductors with said coordinate array of said card aligned with said coordinate array of conductor crossovers.

10. The information storage arrangement defined in claim 9 wherein said dielectric sheet is a *c* domain type crystal having its *c* axis perpendicular to its faces and wherein said first compressional force and said second compressional force applied to said conductor crossovers are in a direction parallel to the *c* axis direction of said crystal.

11. An information storage arrangement comprising a pair of plates of insulating material spaced apart in substantially parallel planes, a plurality of parallel conductors on each of said plates, said conductors on one of said plates positioned at right angles to said conductors on the other of said plates to define a coordinate array of crosspoints, a sheet of dielectric material having pressure sensitive permittivity positioned between said first and said second plates, a changeable memory card of insulating material positioned adjacent said sheet of dielectric material between said first and second plates, said memory card having binary information stored therein as the presence or absence of apertures arranged in a coordinate array, means for aligning said memory card between said plates so that the points of said coordinate array of said card are positioned between associated crosspoints formed by said conductors, and means for applying a compressional force between said first and second plates so that the permittivity of said dielectric material adjacent an aperture in said memory card remains substantially normal and so that the permittivity of said dielectric material adjacent a coordinate point of said memory card having no aperture is substantially increased.

12. The information storage arrangement defined in claim 11 further comprising means for sensing said binary information stored in said memory card, said means comprising means for applying a voltage pulse to a selected one of said conductors on said one of said plates, and means for detecting the current flow in each of the parallel conductors on the other of said plates.

References Cited in the file of this patent

UNITED STATES PATENTS

| | | |
|---|---|---|
| 2,725,548 | Harris | Nov. 29, 1955 |
| 2,872,664 | Minot | Feb. 3, 1959 |
| 2,907,984 | Anderson | Oct. 6, 1959 |
| 2,924,970 | Samsel et al. | Feb. 16, 1960 |
| 3,003,143 | Beurrier | Oct. 3, 1961 |
| 3,011,156 | MacPherson | Nov. 28, 1961 |